United States Patent [19]

Feurstein et al.

[11] 4,029,194
[45] June 14, 1977

[54] AUTOMATIC INDEXING AND TRANSFERRING APPARATUS

[75] Inventors: Ludwig J. Feurstein, Sheboygan; Otis E. Meives, Cleveland; Roger E. Schelk, Sheboygan, all of Wis.

[73] Assignee: Pemco, Inc., Sheboygan, Wis.

[22] Filed: Apr. 23, 1975

[21] Appl. No.: 570,912

Related U.S. Application Data

[63] Continuation of Ser. No. 469,562, May 13, 1975, abandoned.

[52] U.S. Cl. .............................. 198/358; 198/456; 198/487; 198/611; 198/862
[51] Int. Cl.² ....................................... B65G 47/42
[58] Field of Search ................. 198/21, 23, 29, 34, 198/37, 76, 127 R, 358, 456, 487, 611, 748, 862

[56] References Cited

UNITED STATES PATENTS

| | | | |
|---|---|---|---|
| 1,954,278 | 4/1934 | Adams | 198/21 |
| 2,369,575 | 2/1945 | Kay | 198/34 X |
| 2,978,092 | 4/1961 | Phillips et al. | 198/32 |
| 3,187,878 | 6/1965 | Harrison et al. | 198/37 |
| 3,218,066 | 11/1965 | Halberschmidt et al. | 198/21 X |
| 3,518,944 | 7/1970 | Patin | 198/127 R |
| 3,602,358 | 8/1971 | Jakobsson | 198/34 X |

*Primary Examiner*—Evon C. Blunk
*Assistant Examiner*—James L. Rowland
*Attorney, Agent, or Firm*—Pollock, Vande Sande & Priddy

[57] ABSTRACT

A combined transfer table and article indexing apparatus comprises means for receiving and separating articles from an infeed conveyor and means for transferring the separated articles to an outfeed conveyor, in synchronous relation to movement of the outfeed conveyor. Means for automatically aligning the edges of stacked articles conveyed as a group, such as reams of paper, are also provided.

5 Claims, 7 Drawing Figures

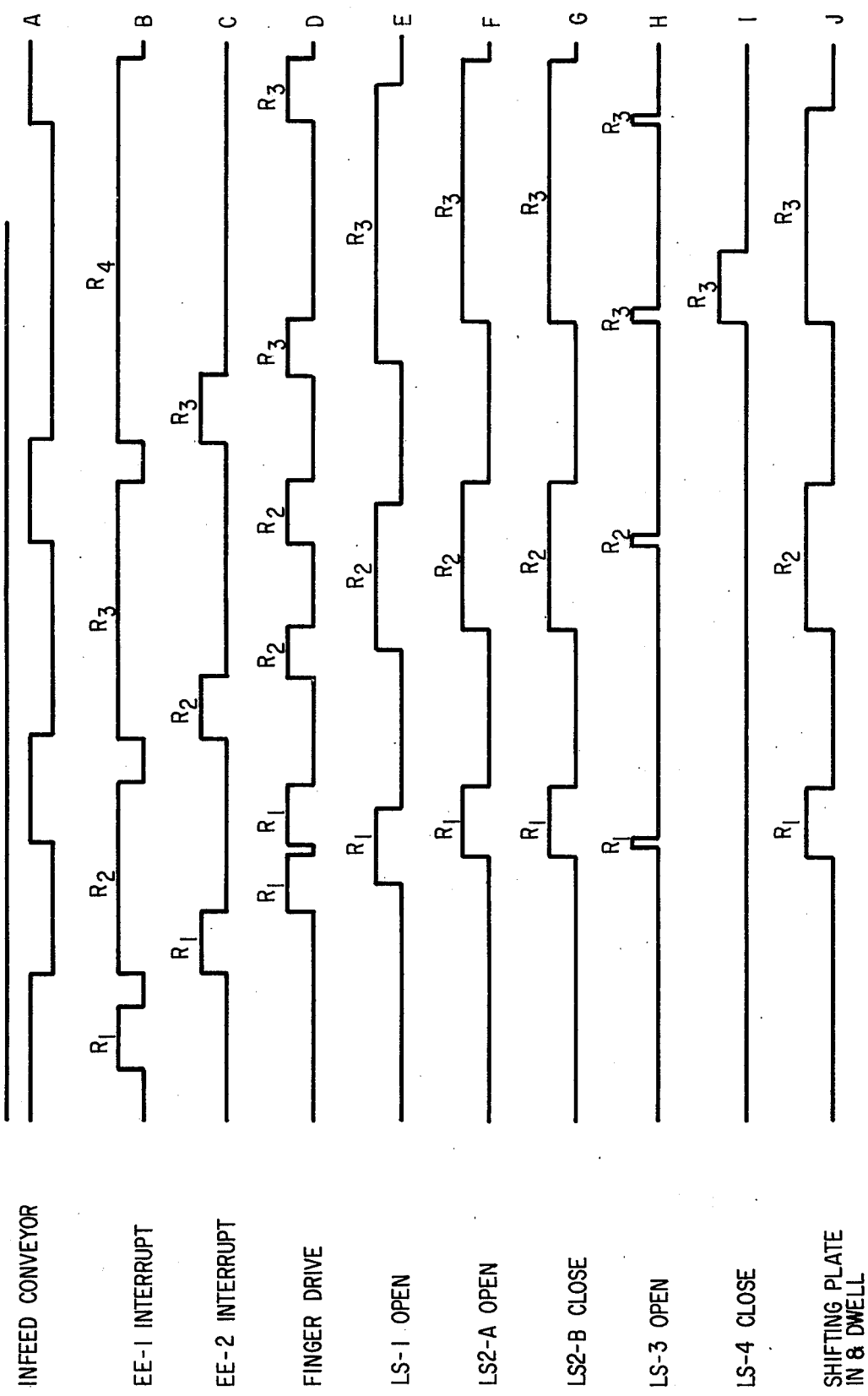

4,029,194

AUTOMATIC INDEXING AND TRANSFERRING APPARATUS

This is a continuation, of application Ser. No. 469,562, filed May 13, 1975 now abandoned.

BACKGROUND OF THE INVENTION

This invention relates to apparatus for sequentially receiving a series of articles to be conveyed from an infeed conveyor; separating each article by a preselected distance from the articles ahead of and behind it; and transferring the separated articles to an outfeed conveyor which delivers them to a further processing station.

The invention is particularly suited for use in indexing and transferring stacks of sheet material such as reams of paper received from an infeed conveyor of a sheeting machine which cuts and stacks the sheets, to an outfeed conveyor leading to a wrapping machine which wraps each ream for shipment. The prior art discloses some types of transferring and indexing apparatus for handling reams of paper in such a fashion which are highly complex in nature. To obtain separation of the reams as they are received from the infeed conveyor, the art teaches that one may accelerate the leading ream to a speed in excess of the infeed conveyor speed. This causes the stacked sheets of paper to shift or skew toward the trailing edge of the ream. Furthermore, the lower sheets of the ream frequently tend to wrinkle from the leading edges toward the trailing edge as the ream passes over prior art types accelerating rollers. The misalignment of the ream caused by such shifting enlarges the overall space occupied by the ream, which can interfere with operation of the outfeed conveyor and wrapping machine. Wrinkling of the lowermost sheets may cause similar interference and generally detracts from the quality of the wrapped product. Complicated prior art solutions to these problems have included arrays of reciprocating paddles located above an indexing and transfer station, which paddles contact the ream from the rear, causing some realignment of its sheets, and transfer it to an outfeed conveyor. The location of such paddle mechanisms above the path of the reams being conveyed has created problems with maintenance, in that the transfer station is not readily accessible in the event of a malfunction such as jamming with the outfeed conveyor.

Frequently in assembling a system comprising an infeed conveyor, an indexing and transferring station and an outfeed conveyor, it is not possible or practical due, say, to space limitations or the particular infeed and outfeed conveyor characteristics, to deliver articles ready for direct transfer to the outfeed conveyor. That is, the articles may be shifted to one side or another of the desired location for transfer. The prior art suggests a variety of manually adjustable guiding elements which may be used to correct such problems; however, known devices are too slow to use in a high speed conveying system and have not been found suitable for maintaining the alignment of the edges of stacks of sheet material such as paper reams.

An additional problem that has been encountered with known indexing and transfer stations concerns synchronizing operation of the infeed conveyor, the transfer station and the outfeed conveyor to provide continuous delivery of articles onto the outfeed conveyor. Usually, the outfeed conveyor in prior art transfer systems is operating at a slightly higher rate of speed than the product on the infeed conveyor. The transfer station must be able to stop and wait until the outfeed conveyor is in a position to receive the product. Additionally, the outfeed conveyor may stop for a variety of reasons, at which time the transfer station must stop and wait, while providing a control for the infeed conveyor.

This problem is acute with prior art belt transfer stations which anticipate stopping of the outfeed conveyor, thus requiring close timing to avoid jamming and similar problems, particularly with outfeed conveyors having alignment paddles for guiding the articles being conveyed.

An object of this invention is to provide an article indexing and transferring system which will separate articles to be conveyed and deliver them continuously to an outfeed conveyor.

A further object of this invention is to provide means in such an apparatus for aligning the vertical edges of stacks of sheet material while such stacks are being transferred.

Still another object of the invention is to provide such an apparatus in which the articles being conveyed, and the elements of the apparatus contacting the articles to index and transfer them, are readily accessible from above without requiring partial disassembly of the apparatus.

Another object of the invention is to provide means for indexing or separating reams of paper without wrinkling the lowermost sheets of the ream.

Yet another object of this invention is to provide means for automatically shifting articles received from an infeed conveyor to a location properly situated for direct transfer to an outfeed conveyor.

A still further object of this invention is to provide such an apparatus in which the speed of indexing and transfer may be varied as required to suit a particular outfeed conveying system.

The above objects are considered exemplary of the purposes of this invention. Although those skilled in the art may perceive additional objects of the disclosed apparatus the failure to mention such objects here is not to be taken in any way to limit the scope of the disclosed invention as defined in the claims hereafter presented.

SUMMARY OF THE INVENTION

In the light of the deficiencies of prior art devices as discussed above, the invention comprises a table for receiving articles from an infeed conveyor, said table having mounted therebeneath a plurality of indexing rollers which extend slightly above the upper surface thereof. An article is moved onto the upper surface of the table in position to contact at least some of said indexing rollers, which pull the article from the infeed conveyor at a speed in excess of that of the infeed conveyor, thereby separating each article from the one following it. A plurality of transferring fingers are caused to move upward through openings in the table and to engage the rear edge of the article to push it toward an outfeed conveyor. A system of electronic eyes and cam-operated switches is included which coordinates operation of the infeed conveyor and transferring fingers to move articles to the outfeed conveyor as fast as the outfeed conveyor can receive them. Means are provided for preventing transfer of an article to the outfeed conveyor when a previous article has not been moved away by the outfeed conveyor. Also, means are provided for aligning the edges of the articles being conveyed and for shifting the articles to a preferred location on the table surface.

Finally, the indexing rollers, transferring fingers and their actuators are mounted on an interior frame movable relative to the table, to permit adjustment of the device relative to the outfeed conveyor to account for differing sizes of articles being conveyed.

BRIEF DESCRIPTION OF THE DRAWINGS

FIG. 7 shows a time chart indicating schematically the sequence of operation of the components of the invention.

DESCRIPTION OF THE PREFERRED EMBODIMENT

Figure 1:
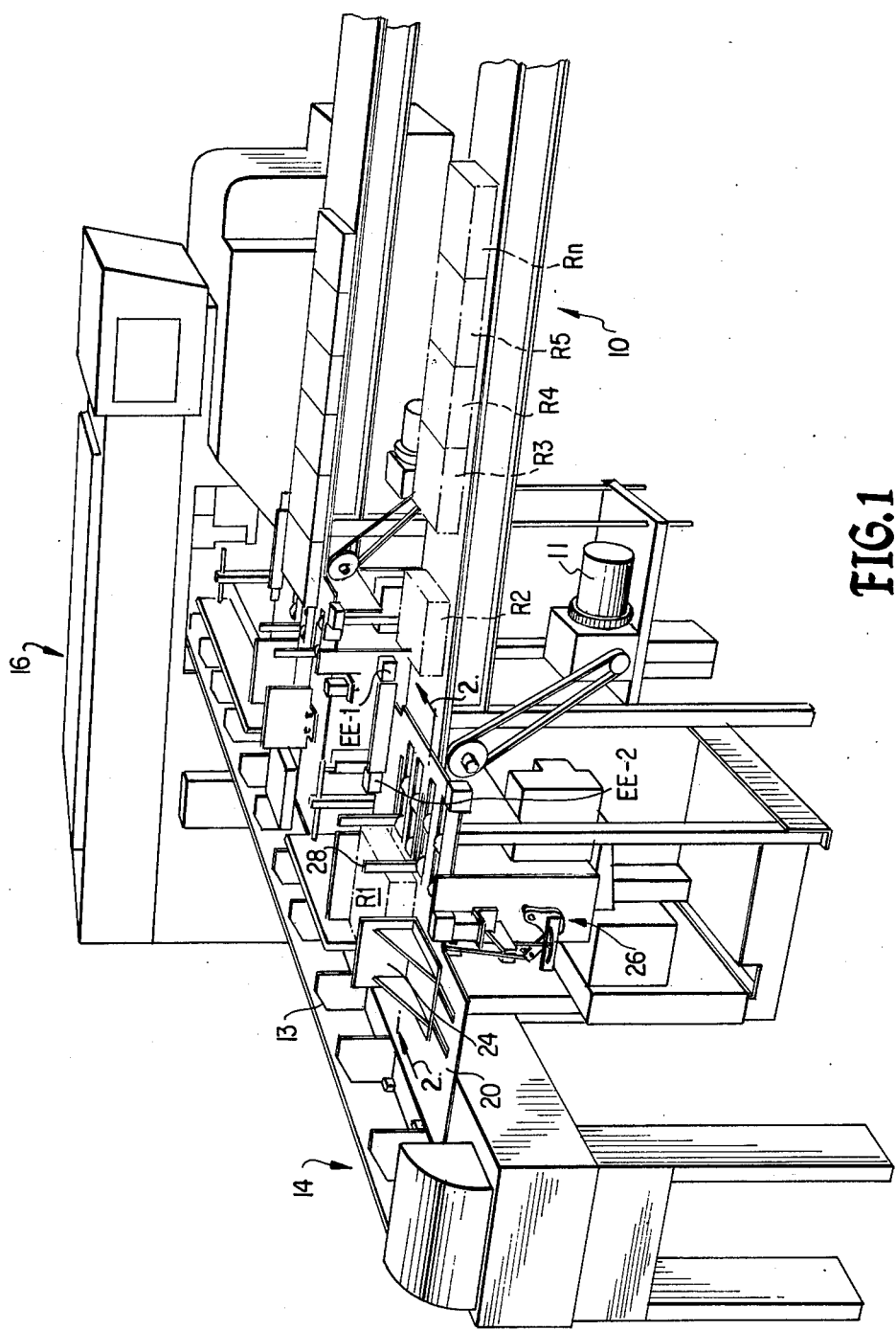
FIG. 1 shows a perspective view of an article indexing and transferring apparatus embodying the invention, in combination with infeed and outfeed conveyors.

There follows a brief description of a preferred embodiment of the invention, reference being had to the drawings, in which like reference numerals and letters identify like elements of structure in each of the several FIGURES.

FIG. 1 shows a view of a system incorporating the indexing and transfer apparatus of the invention. Articles $R_1$ to $R_n$ are conveyed from right to left by an infeed conveyor 10, driven by motor 11; received by an automatic indexing and transferring apparatus 12; delivered to an outfeed conveyor 14 and conveyed to an additional processing station 16, such as a wrapper for articles $R_1$ to $R_n$. Outfeed conveyor 14 may include alignment paddles 13 for maintaining the position of articles $R_1$ or $R_n$ as they move to processing station 16. As each article reaches indexing and transferring apparatus 12, it passes photocell or electronic eye EE-1, thereby actuating a portion of the control circuitry of the invention, as will be discussed with regard to FIG. 6. Indexing and transferring apparatus 12 includes a stationary frame 18 having a flat receiving surface or table 20 mounted thereon. Extending upwardly through the surface 20 are a plurality of rows of indexing rollers 22 and 23, each operating at progressively higher speeds relative to infeed conveyor 10. Each article $R_1$ to $R_n$ is accelerated away from the following article, thereby being spaced therefrom, and eventually passes photocell or electronic eye EE-2, thus actuating additional portions of the control circuitry of the invention.

At this point, provided (a) no other article is blocking the way on outfeed conveyor 14 and (b) outfeed conveyor 14 is positioned to receive an article, transferring fingers 28 are caused to rise behind the article and push it onto outfeed conveyor 14. If the article is received on table 20 at a point displaced from the a preferred alignment with outfeed conveyor 14 automatic shifting and alignment plate 24 may be actuated by alignment plate linkage 26 to move the article from left to right on table 20, in the embodiment shown, before fingers 28 are in position to contact the article. It should be understood that the invention may be adapted to transfer to outfeed conveyors moving from either right or left relative to the indexing and transferring apparatus or station and to receive and realign, if necessary, articles from infeed conveyors aligned with or displaced to either side of a preferred alignment with outfeed conveyor 14. As shown, it is also possible to use more than one indexing and transferring apparatus to transfer articles from two infeed conveyors to a common outfeed conveyor since each indexing and transferring apparatus of the invention will transfer articles to the outfeed conveyor only when there is space there to receive them.

Figure 2:
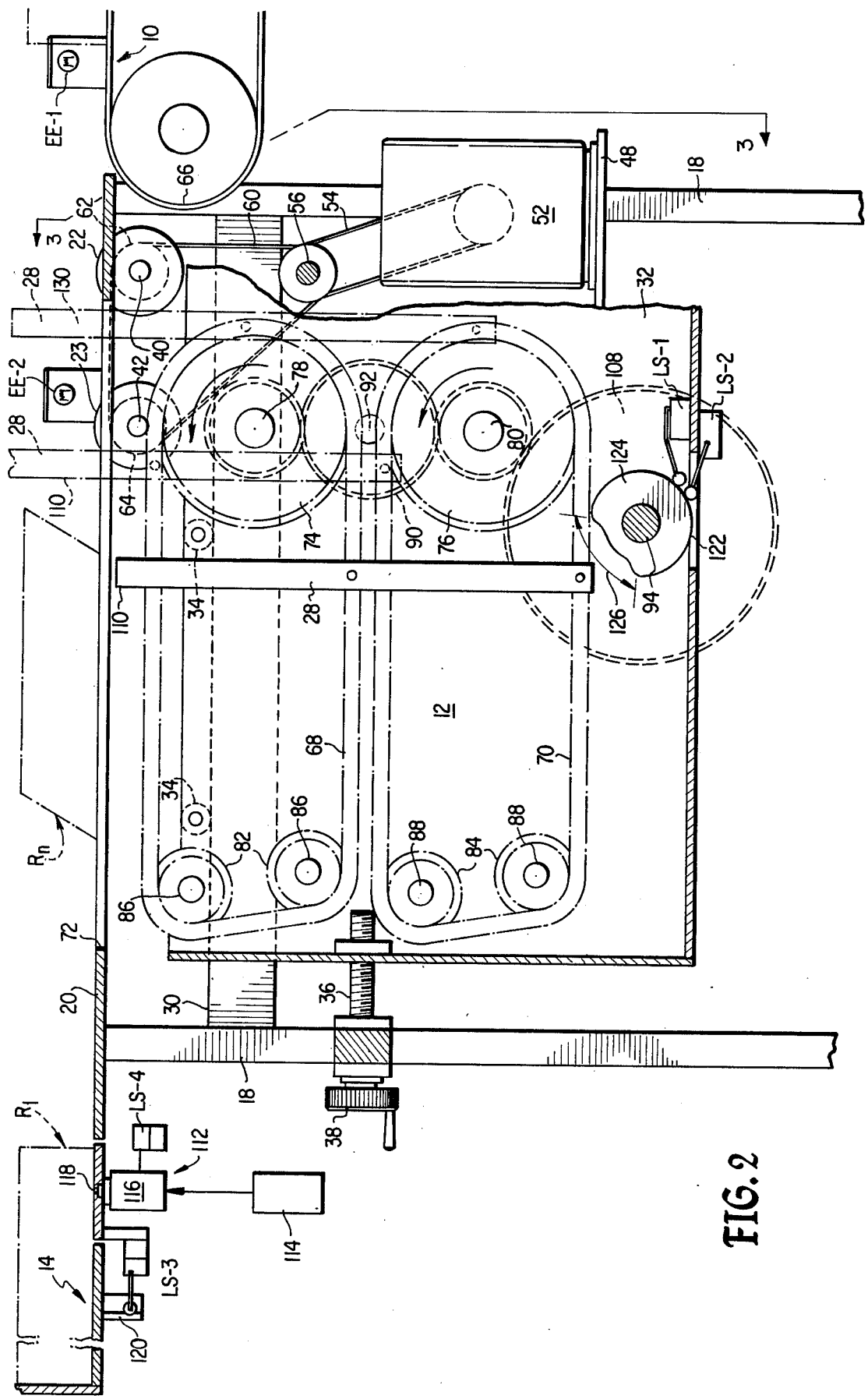
FIG. 2 shows a side elevation, partially in section, of the invention, taken along line 2—2 in FIG. 1.
Figure 3:
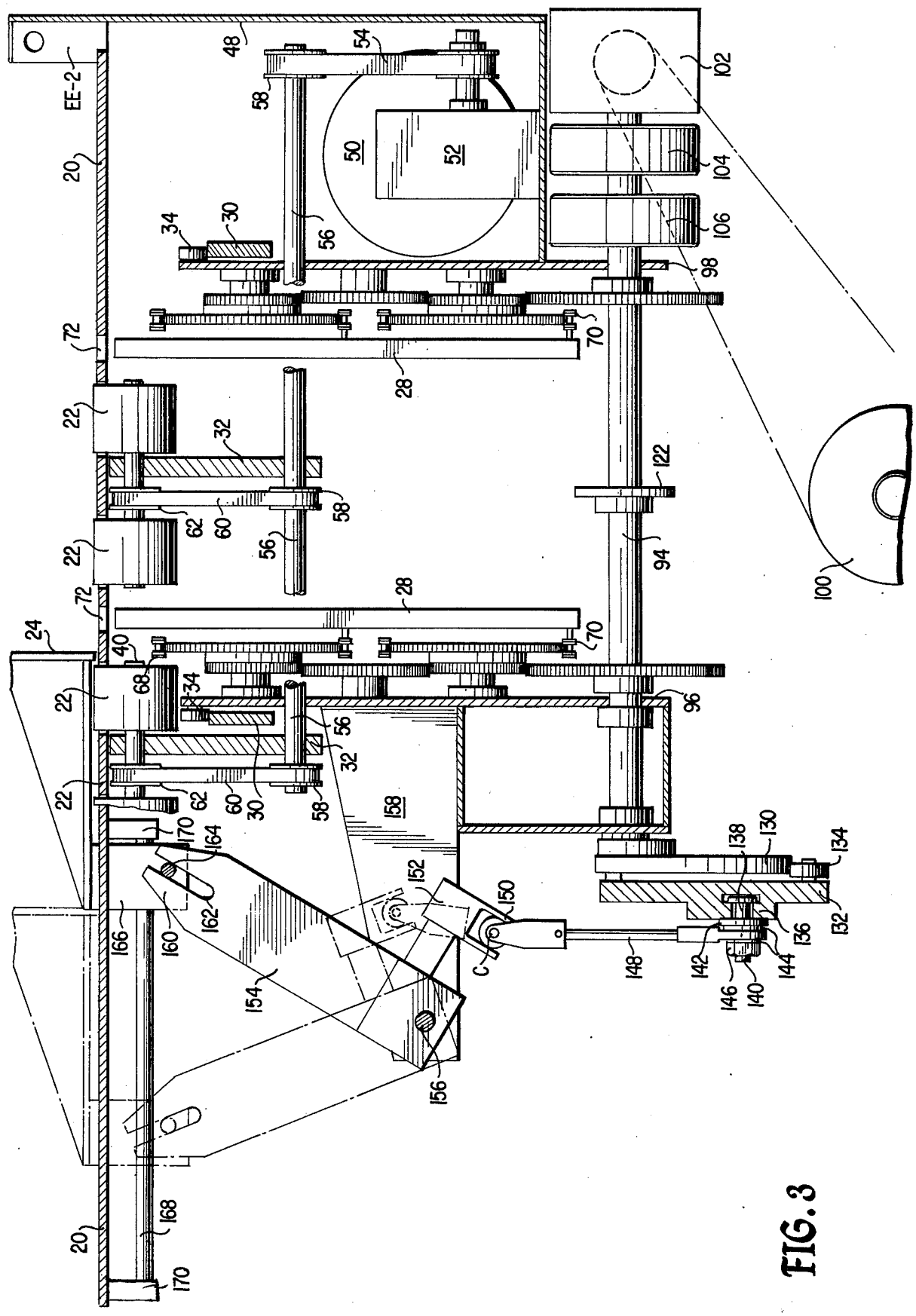
FIG. 3 shows a front end view of the invention, partially in section, taken along line 3—3 in FIG. 2.

Referring now to FIGS. 2 and 3, the details of the invention may be understood. Stationary frame 18 includes longitudinal rails 30, upon which is supported interior frame 32 of essentially box-like configuration, via rollers 34. A lead screw 36 is threadedly received in stationary frame 18 at one end thereof and fixedly but rotatably fixed to interior frame 32, as shown. A handwheel 38 may be used to adjust the position of interior frame 32 relative to stationary frame 18, for purposes to be discussed hereinafter.

Indexing rollers 22 and 23 are mounted on axles 40 and 42, journaled for rotation in interior frame 32 as shown in 46. A bracket 48, attached to interior frame 32, supports indexing motor 50 and gearbox 52, which drive shafts 40 and 42 via output chain or belt 54, transfer shaft 56, sprockets or pulleys 58, transfer chains or belts 60 and sprockets or pulleys 62 and 64. Sprockets or pulleys 62 and 64 are sized so that rollers 23 move at a higher speed than rollers 22; that is, sprocket or pulley 64 has fewer teeth or a smaller radius than sprocket or pulley 62. Gearbox 52 is chosen to rotate elements 62 and 64 so that rollers 22 and 23 attain higher peripheral, or linear, speeds than the infeed conveyor 10. Thus, rollers 22 and 23 pull each article away from the infeed conveyor as soon as the article contacts the rollers under the influence of the infeed conveyor. When stacks of sheets of paper are being conveyed, the progressively high speeds of rollers 22 and 23 tend to keep the lowermost sheets stretched, thus minimizing wrinkling of these sheets such as would occur if only single indexing rollers were used.

Electronic eye or photocell EE-1 is located just before end 66 of infeed conveyor 10, spaced from end 66 a distance chosen to permit infeed conveyor 10 to coast to a stop when EE-1 is interrupted by the forward edge of an article, without permitting the interrupting article to coast into contact with continuously spinning rollers 22 and 23. Electronic eye EE-2 is spaced a fixed distance from EE-1 near the centerline of roller 23. The distance is selected to ensure that rollers 22 and 23 have moved each article far enough onto table 20 to permit the indexing fingers 28 to rise behind the article when the fingers are activated by the complete movement of each article past EE-2, as will be discussed. If the spacing is too small, however, the infeed conveyor 10 may be shut off by the control system before the leading article has left it, which may produce improper indexing, or separating, of the articles, depending on their weight and the friction developed with rollers 22 and 23.

Transferring fingers 28 are pivotally mounted to parallel chains 68 and 70 at either side of interior frame 32 and pass through slots 72 in table 20 when in their elevated positions, as shown in phantom. Due to the parallel paths of chains 68 and 70, fingers 28 are always maintained in a vertical position, as shown. Upper and lower compound sprockets 74 and 76 are journaled to interior frame 32 at 78 and 80 to support chains 68 and 70 just below rollers 22 and 23. Upper and lower sprocket pairs 82 and 84 are journaled to interior frame 32 at 86 and 88 to support chains 68 and 70 at the opposite end of interior frame 32. Idler gears 90 journaled to interior frame 32 at 92, mesh with the smaller gears of compound sprockets 74 and 76. Timing shaft 94, journaled for rotation in interior frame 32 at 96 and 98, is driven by motor 100 through gearbox 102, electrically actuated clutch 104 and electrically actuated brake 106. Fixed to shaft 94 are drive gears 108 which mesh with the smaller gears of compound sprockets 76 to drive the indexing fingers.

As shown, fingers 28 comprise flat leading edges 110 which are maintained essentially vertical as the fingers move. A ream of paper $R_n$, shown in phantom in FIG. 2, has its leading and trailing edges misaligned. As fingers 28 contact ream $R_n$, these edges are realigned by leading edges 110 as ream $R_n$ moves to the left toward outfeed conveyor 14. Thus, the ream is prepared for further operations such as wrapping during its transfer to the outfeed conveyor.

The arrival of an article such as ream $R_1$ on outfeed conveyor 14 is monitored by pneumatic sensing system 112. A source of pressurized air 114 is connected to volume 116 which includes an orifice opening 118 positioned adjacent to the moving portion of conveyor 14, in a position to be covered by an article $R_1$ just transferred to conveyor 14. When orifice 118 is closed, the pressure in volume 116 rises, actuating pressure sensitive switch LS-4 which is operatively connected to volume 116. Switch LS-4 closes a circuit in the control system of the invention, as will be discussed regarding FIG. 6. The sensitivity of pneumatic sensing system 112 may be finely adjusted by varying the size of orifice 118 so that the venturi effect created at the orifice will cause even very light weight articles such as single sheets of paper to be pulled against and block orifice 118 and actuate switch LS-4. In practice, using a 50 psi, 0.25 cfm air source, an orifice size produced by a number 55 drill has proven sensitive to single sheets of paper.

Fixed adjacent the moving portion of conveyor 14 is switch LS-3 which may be tripped by one of a plurality of feelers 120 mounted at spaced locations (not shown) on the moving portions of conveyor 14, to open switch LS-3 when the conveyor 14 is in position to receive an article as when alignment paddles 13 (see FIG. 1) are in position to receive an article therebetween. Switch LS-3 opens a circuit in the control system, as will be discussed. Alternatively, switch LS-3 might be opened by a cam located in additional processing station 16 to signal the need for additional articles for processing, such as wrapping.

Timing cam 122, fixedly attached to shaft 94, includes a dwell segment 124 of constant radius extending over an arc of 242° on its face and switch actuating segment 126 extending over an arc of 118°. Switches LS-1 and LS-2 are mounted on an extension 128 of interior frame 32 in position to be actuated by cam 122, as indicated. When fingers 28 are approaching their uppermost position behind the article to be transferred, as at 130, switch LS-1 is actuated by cam 122 to permit fingers 28 to interrupt EE-2 without actuating the control circuitry of the invention. When fingers 28 have pushed the article onto conveyor 14, switch LS-2 is actuated by cam 122, thus deactivating motor 100 via the control circuitry of the invention. Both switches are then returned to their normal position by cam 122.

Figure 4:
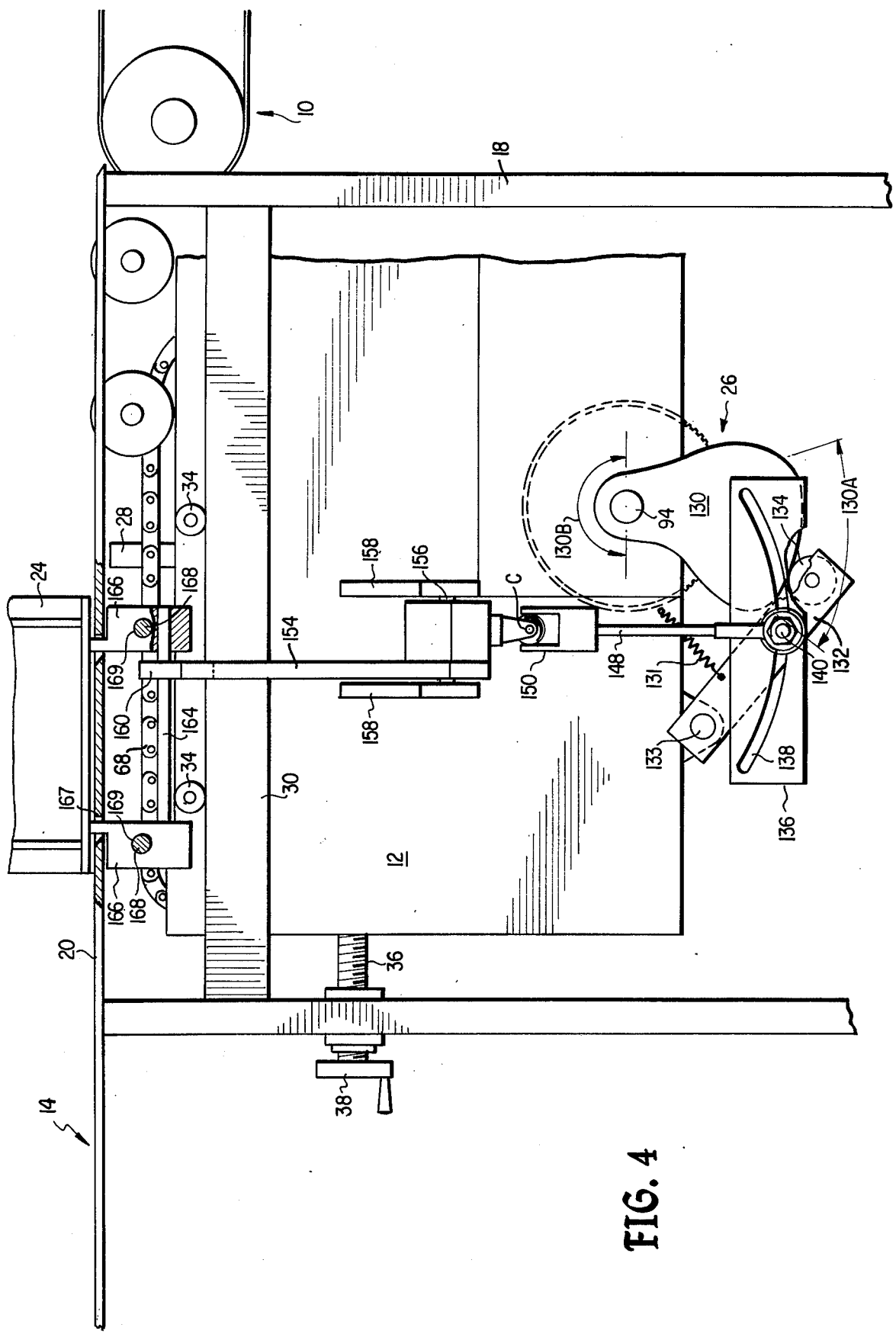
FIG. 4 shows a side elevation view of the invention, indicating certain details of the automatic shifting mechanism.

Referring now to FIGS. 3 and 4, the operation of the automatic shifting and alignment plate 24 and associated linkage 26 may be understood. Timing shaft 94 extends through the side wall of interior frame 32 and has shifting cam 130 fixedly mounted on the outer end thereof for rotation therewith. A cam follower link 132 is pivoted to interior frame 32 at 133 and biased to the right as shown in FIG. 4 by spring 131 attached to interior frame 32 and cam follower 132 as shown. Cam roller 13 provides a contact between cam 130 and follower link 132. Rigidly attached to cam follower link 132 is guide plate 136, which includes an arcuate slot 138 therethrough. A bolt 140, washer 142, lock washers 144 and nut 146 are located in slot 138 to provide a variable, rigid attachment point for the lower end of drive link 148. That is, by loosening nut 146, the position of the lower end of drive link 148 may be shifted in slot 138 to move closer to or away from pivot point 133 of cam follower link 132. At the upper end of drive link 148 is mounted universal joint 150 which is connected to crank arm 152 of shifting arm 154. Arm 154 is pivotally mounted on shaft 156, supported by brackets 158 attached to interior frame 32. Thus, as cam follower link 132 pivots in response to rotation of cam 130, drive link 148 moves as shown in phantom, causing shifting arm 154 to rock about the axis of shaft 156.

Automatic shifting and alignment plate 24 rides on an extension of table surface 20. End 160 of shifting arm 154 includes an elongated slot 162 which engages traverse bar 164 attached between sliding support brackets 166 which extend beneath alignment plate 24, through elongated slots 167 in table surface 20. Sliding support brackets 166 include through bores 169 in which rods 168 are slidably received. Rods 168 are attached to the underside of table surface 20 by support brackets 170 so that rods 168 are parallel to elongated slots 167. Thus, as shifting arm 154 rocks counterclockwise from the position of FIG. 3, the edges of slot 162 engage traverse bar 164, causing alignment plate 24 to move to the left, sliding along rods 168.

Obviously, the rotation of cam 130 governs the timing of any movements of alignment plate 24; and the position of drive link 148 in slot 138 governs the distance through which alignment plate 24 is moved along table surface 20. As shown in FIG. 4, cam 130 includes a dwell surface 130A extending over an arc 28° at a maximum radius, which causes cam follower link 132 to rotate to its lowest position relative to table surface 20. At this location, the vertical position of drive link 148 defines the center C of the radius of arcuate slot 138 which will ensure that alignment plate 24 always returns to the right-hand position shown in FIG. 3. Here, plate 24 will properly position articles leaving rollers 22 and 23 for transfer by fingers 28. Movement of link 148 through slot 138 and about universal 150, will produce no rocking or shifting arm 154 from the position shown; however, fixing the lower end of drive link 148 to the left or right of the vertical position will alter the amount of movement of shifting arm 154 when cam 130 moves from maximum radius dwell surface 130A to minimum radius dwell surface 130B which extends over an arc of 180°. If the lower end of drive link 148 is fixed to the left of the vertical position illustrated, the leftward movement of shifting arm 154 and, hence, alignment plate 24 will be shortened; whereas, if the lower end of drive link 148 is fixed to the right of the vertical position illustrated, the leftward movement of shifting arm 154 and alignment plate will be lengthened. One skilled in the art will appreciate that the surfaces of cam 130 between dwell surfaces 130A and 130B are determined by the desired speed with which the alignment plate is to move between its extreme positions. In practice, the alignment plate is moved from left to right as fingers 28 begin to rise above table 20 and from right to left just after fingers 28 come into contact with the article to be conveyed, thereby placing the article in position for transfer by fingers 28; however, the timing may be adjusted to fit a particular application by appropriate design of cam 122, as will be appreciated by those in the art.

In some instances, it may be desirable to move the interior frame 32 and its attachments relative to the infeed or outfeed conveyors to ensure proper indexing and transferring, using lead screw 36 and hand wheel 38, as discussed with respect to FIG. 2. When this happens, the actuation of the automatic shifting and alignment plate is not affected, since slot 162 in shifting arm 154 is slidably engaged with traverse bar 164, permitting relative movement between the alignment plate 24, which rides on stationary table surface 20, and its actuating linkage 26, which moves with interior frame 32.

Figure 5:
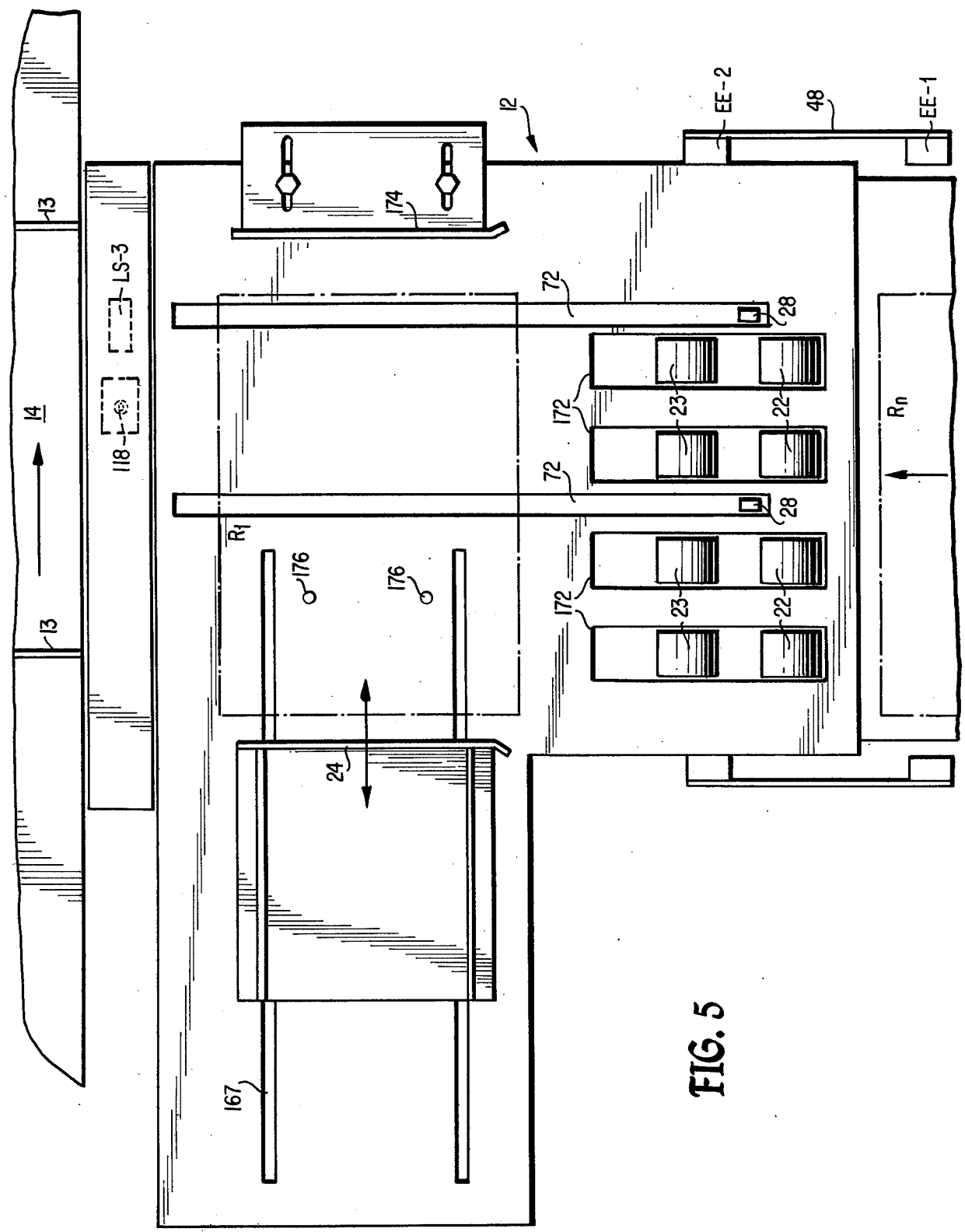
FIG. 5 shows a plan view of the top of the invention, indicating the cooperation of the indexing rollers, the automatic shifting mechanism and the transferring fingers.

Referring now to FIG. 3 and FIG. 5, the purpose of the automatic alignment plate 24 may be understood. Table surface 20 is smoothly finished to facilitate movement of articles to be conveyed and may be made of commercially available materials having an impregnation of polytetrafluoroethylene for reduced surface friction. Indexing rollers 22 and 23 are located in elongated openings 172 which are sized to permit movement of the rollers when interior frame 32 is adjusted, as previously discussed. Transferring fingers 28 move through slots 72 to push articles indexed by the rollers onto outfeed conveyor 14.

If articles such as reams $R_1$ are received from infeed conveyor 10 in essentially symmetric alignment with paths of pushing fingers 28 for transfer to outfeed conveyor 14 between alignment paddles 13, then fingers 28 may push the reams past stationary aignment plates such as 174, located on either side of the path of fingers 28. Only the right hand stationary plate is shown, it being understood that a similar plate could be located on the left side of the device using mounting holes 176. The alignment plates align the edges of the ream as it is transferred and position the ream properly for receipt by the outfeed conveyor 14.

If, however, articles are received at a location displaced from the paths of pushing fingers 28, as indicated in phantom, their position must be shifted to ensure proper transfer by fingers 28 and proper location on conveyor 14. The phantom ream $R_1$ is shown as it would be located after indexing by rollers 22 and 23, in which it rests above slots 167 in table surface 20. Alignment plate 24 has been moved to the position shown in response to cam 130 and will shift ream $R_1$ to the right and into contact with stationary alignment plate 174, as fingers 28 rise through slots 72 and into contact with ream $R_1$. Alignment plate 24 will remain in this position until the ream has been transferred to outfeed conveyor 14, as governed by dwell surface 130A of cam 130. It then retracts to a left hand position determined by the anticipated displacement of reams coming from infeed conveyor 10 and regulated by the location of the lower end of drive link 148 in arcuate slot 138, where it remains for a period of time governed by dwell surface 130B of cam 130. When automatic shifting and alignment is not required, linkage 26 may be deactivated at bolt 140 and the automatic alignment plate slid out of the way to permit installation of a stationary plate in holes 176.

Figure 6:
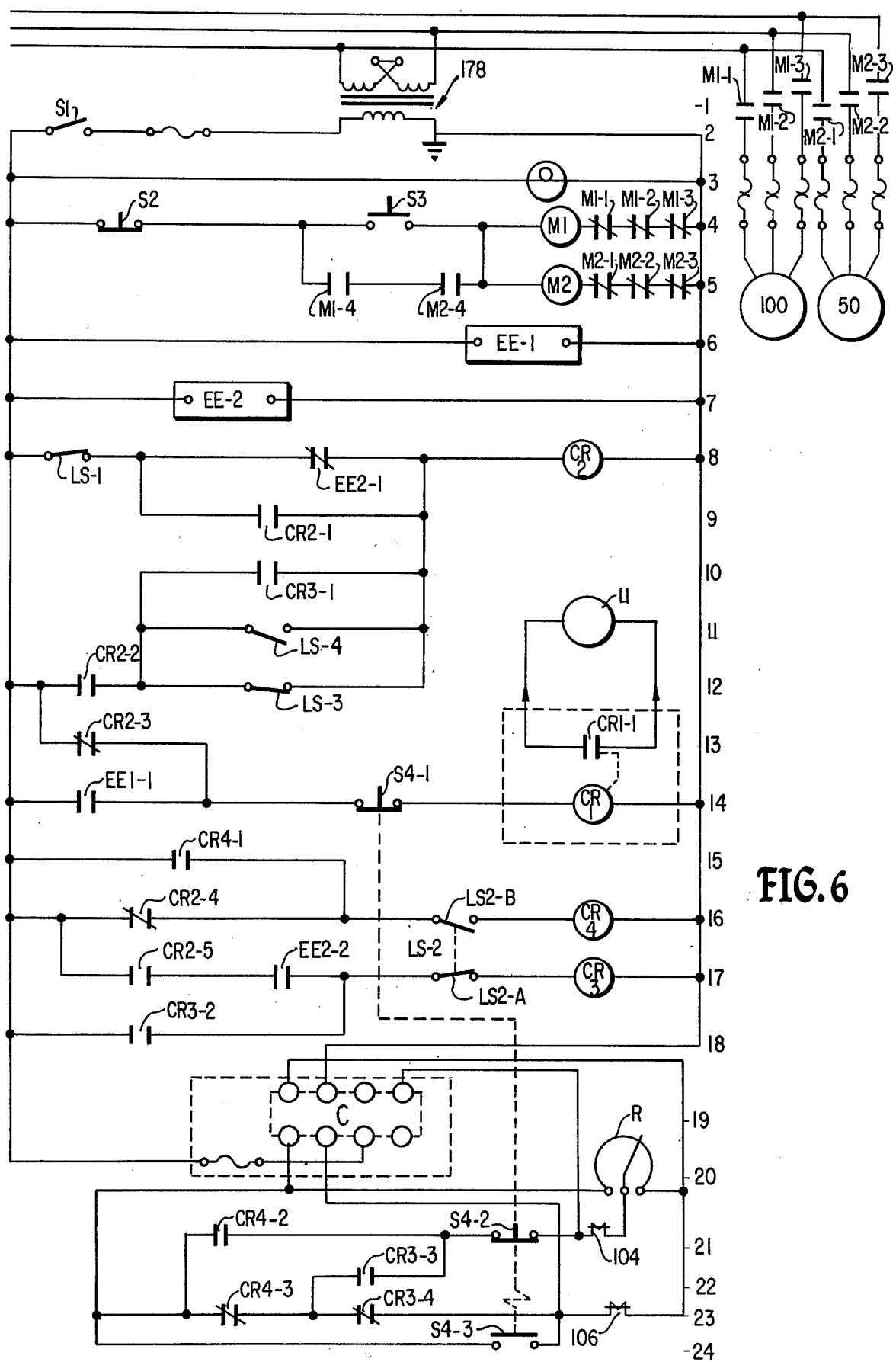
FIG. 6 shows a circuit diagram of the controls which synchronize operation of the elements of the invention.

FIG. 6 shows the control circuitry of the invention. All switches are shown in their normal position when their activating cam or relay is deenergized. Previously discussed elements such as electronic eyes EE-1 and EE-2, motors 11, 50 and 100, clutch 104, brake 106, and switches LS-1 to LS-4 are shown in their appropriate positions. For simplicity, the connections between various relays and contacts actuated thereby are not shown, the labelling of each relay and its contacts being sufficient to interrelate them clearly, in the light of the following discussion.

With air supply 114 and power supply 178 operative, the fingers 28 are manually brought to a position below table surface 20 prior to closing master switch S-1 (line 2). The electronic eye circuits in EE-1 and EE-2 (line 6 & 7) will switch unless their light beams are interrupted. Switch S-3 (line 4) is closed, thereby energizing motor starters M1 and M2 (line 4 & 5), starting motors 50 and 100, and closing holding contacts M1-4 and M2-4 (line 5).

CLosing contact S4-1 (line 14) energizes the infeed conveyor control relay CR1-1 (line 13) and starts motor 11 of infeed conveyor 10, thus delivering articles to the indexing and transferring apparatus of the invention. As the leading ream interrupts EE-1 (line 6), contact EE1-1 (line 14) opens; however, contact CR2-3 remains closed and motor 11 continues to run. As the leading ream contacts indexing rollers 22 and 23, it is accelerated away from the following ream and eventually interrupts EE-2 (line 7), which causes contact EE2-1 (line 8) to close, thereby energizing finger motor relay CR2 (line 8), which closes contacts CR2-1 (line 9) and CR2-2 (line 12). Contact CR2-3 now opens; however, contact EE1-1 has closed since the leading ream has passed EE-1, keeping CR1 (line 14) energized. When the following ream interrupts EE-1, contact EE1-1 (line 14) opens, deenergizing CR1 (line 14) and stopping motor 11 of the infeed conveyor.

When the leading ream has moved to a position in which the fingers 28 may come behind it, due to the action of rollers 22 and 23, the light beam of EE-2 (line 7) is restored, thereby closing contact EE2-2 (line 17). Contacts CR2-1 and CR2-2 remain closed, thereby maintaining power to relay CR2 (line 8). Contact CR2-5 (line 17) is closed, thereby energizing finger control relay CR3 (line 17) which closes holding contacts CR3-2 (line 18) and CR3-3 (line 22) and opens holding contact CR3-4 (line 23). Brake 106 is thus deenergized and clutch 104 is energized, thereby driving finger 28 toward engagement with the leading ream. As finger 28 nears the light beam of EE-2 (line 7), switch LS-1 (line 8) is opened by cam 122, thus preventing the interruption of EE-2 from affecting EE2-1 (line 8). Contacts CR2-2 (line 12) and CR3-1 (line 10) are closed, keeping CR2 (line 8) energized. When the fingers 28 are behind the leading ream, switch LS-2 is actuated by cam 122, opening contact LS2-A (line 17) and closing contact LS2-B (line 16), thus deenergizing relay CR3 (line 17). Contact CR3-3 (line 22) opens, deenergizing clutch 104 and contact CR3-4 closes, energizing brake 106. Contact CR3-1 (line 10) opens, however relay CR2 (line 8) remains energized via contact CR2-2 (line 12) and switch LS-3 (line 12).

When the outfeed conveyor is in position to receive a ream, switch LS-3 (line 12) is opened as previously described, thereby cutting power to relay CR2 (line 8) since LS-1 (line 8) remains open. Contact CR2-4 (line 16) thus closes, energizing finger control relay CR4 (line 16), via switch LS2-B (line 16) which remains closed. Holding contacts CR4-1 (line 15) and CR4-2 (line 21) close, while contact CR4-3 (line 23) opens, thus energizing clutch 104 and deenergizing brake 106 to permit fingers 28 to push the ream onto outfeed conveyor 14. Simultaneously with the deenergization of relay CR2 (line 8), contact CR2-3 (line 13) closes, energizing relay CR1 (line 14) and starting motor 11 of infeed conveyor 10. When fingers 28 have pushed the ream onto outfeed conveyor 14, cam 122 closes switch LS-1 (line 8) and deactivates switch LS-2 (line 16 and 17), deenergizing relay CR4 (line 16), opening contact CR4-2 (line 21) and closing contact CR4-3 (line 23) to deenergize clutch 104 and energize brake 106, stopping fingers until the following ream is in position.

If a preceding ream is already in position on outfeed conveyor 14 so as to close switch LS-4 (line 11) in pneumatic monitoring system 112, the opening of switch LS-3 (line 12) will not cut power to relay CR2 (line 8) and the fingers will be stopped until outfeed conveyor 14 not only moves the preceding ream out of engagement with orifice 118, opening switch LS-4 (line 11), but also reopens switch LS-3 (line 12).

Opening switch S4-1 (line 14) will stop infeed motor 11 while simultaneously opening contact S4-2 (line 21) and closing S4-3 (line 24), deenergizing clutch 104 and energizing brake 106. Rheostat R (line 20) is used to adjust the torque applied to the finger drive gears, and commercially available controller C reduces 110 volt AC linepower to 90 volt DC power required to actuate clutch 104 and brake 106. Opening switch S2 (line 4) stops motors 50 and 100. Opening switch S1 (line 2) deenergizes the entire circuit of FIG. 6.

FIG. 7 shows a schematic time chart of the sequence of operation of the major components of the invention. The spacing between time segments have been exaggerated for illustrative purposes. Infeed conveying starts the sequence as shown in line A. The first ream interrupts EE-1 (line B); however, infeed continues until the first ream leaves EE-1 and interrupts EE-2 (line C), by which time a second ream has interrupted EE-1 (line B). When the first ream leaves EE-2 (line C), the finger motor (line D) starts to move fingers 28 to position behind the first ream, prior to which LS-1 (line E) has opened to disable EE-2. LS2-A (line F) opens and LS2-B (line G) closes, stopping the finger motor. When the outfeed conveyor 14 is in position to receive the leading ream, LS-3 (line H) opens briefly, deenergizing CR2 in FIG. 6, and permitting fingers 28 to push the ream onto outfeed conveyor 14. Line H also shows the effect of a delayed opening of LS-3 in a subsequent cycle. Line I shows that switch LS-4 will remain closed preventing deenergization of CR2 until outfeed conveyor 14 has removed a preceding ream from contact with orifice 118.

Finally, line J shows the period of movement of the automatic shifting plate 24. During the initial period of operation of the finger motor, plate 24 moves in to shift the ream to the proper position before fingers 28 are in position behind the ream. The plate then dwells at the innermost position to guide and align the ream during transfer to the outfeed conveyor 14 after which, plate 24 moves out along table surface 20 to its other dwell position. By adjusting the speed of the finger motor 100, it is possible to ensure that switch LS-3 will be opened just as switch LS2-A opens and LS2-B closes, resulting in continuous operation of the system without stopping the finger motor as illustrated.

Having described our invention in such a manner as to enable one of ordinary skill in the art to make and use it, we claim:

1. An article transferring apparatus, comprising:
   a transfer table for receiving articles to be transferred from an infeed conveyor;
   a transferring member for individually moving said articles across said table onto an outfeed conveyor;
   means connected to said transferring member for elevating it behind each individual article and for pushing each individual article with said transferring member across said table onto said outfeed conveyor;
   first control means for actuating said elevating means to elevate said transferring member behind an individual article in position for pushing that article in response to movement of that article onto said table;
   means for monitoring the presence of a preceding article on said outfeed conveyor in the path of a following article, said monitoring means comprising an enclosed volume having an orifice opening in a wall thereof, said opening being positioned to be covered by a preceding article located on said outfeed conveyor in the path of a following article; means for admitting fluid under pressure to said volume; switch means responsive to a preselected pressure rise in said volume when said orifice is covered; and
   means responsive to said switch means for temporarily preventing actuation of said infeed conveyor and said elevating means.

2. An article transferring apparatus, comprising:
   a table having a surface for receiving articles to be transferred from an infeed conveyor;
   a plurality of indexing rollers projecting above said surface of said table for accelerating and separating successive individual articles received from said infeed conveyor, said indexing rollers being arranged to move said articles through a first distance across said table from said infeed conveyor;
   a transferring member for individually moving said articles along a path beyond said first distance and across said table onto an outfeed conveyor;
   means connected to said transferring member for elevating it to a position behind each individual article for pushing that article along said path onto said outfeed conveyor;
   means for shifting any articles received on said table at a location displayed laterally from said path into alignment with said path, said shifting means comprising an upstanding alignment plate mounted for sliding motion across said surface and linkage means driven by said elevating means for moving said alignment plate across said surface into contact with said articles, whereby said articles are moved into alignment with said path;

first control means for actuating said elevating means to elevate said transferring member behind an individual article into said position for pushing that individual article in response to movement of that article onto said table; and means for actuating said shifting means in synchronism with movement of said transferring member as said transferring member is elevated behind each individual article.

3. An article transferring apparatus, comprising:

a table having a surface for receiving articles to be transferred from an infeed conveyor, said table being stationary relative to said infeed conveyor;

a plurality of indexing rollers projecting above said surface of said table for accelerating and separating successive individual articles received from said infeed conveyor, said indexing rollers being arranged to move said articles through a first distance across said table from said infeed conveyor;

a transferring member for individually moving said articles beyond said first distance and across said table onto an outfeed conveyor;

a frame movably mounted to said table for supporting said indexing rollers and said transferring member;

means for adjusting the position of said frame relative to said table and said infeed conveyor;

means connected to said transferring member and mounted to said frame for elevating said transferring member to a position behind each individual article and for pushing each article across said table onto said outfeed conveyor; and first control means for actuating said elevating means to elevate said transferring member behind an individual article into said position for pushing that article, in response to movement of that article onto said table.

4. An article transferring apparatus, comprising:

a transfer table for receiving articles to be transferred from an infeed conveyor;

a transferring member for individually moving said articles across said table onto an outfeed conveyor;

means connected to said transferring member for for elevating it behind each individual article and for pushing each individual article with said transferring member across said table onto said outfeed conveyor; and control means for actuating said elevating means, said control means comprising a source of power connected in circuit with said elevating means, said elevating means having a brake portion and a clutch portion; electronic eye means in said circuit for establishing a first control signal when an individual article has moved onto said table a predetermined distance; means for deactuating said brake portion and actuating said clutch portion in response to said control signal, whereby said elevating means is actuated; a cam driven by said elevating means in synchronism with said transferring member, said cam having a first lobe; and means actuated by said first cam lobe for deactuating said clutch portion and actuating said brake portion to deactuate said elevating means when said transferring member has been elevated into position behind said individual article, until said outfeed conveyor is ready to receive that individual article.

5. An article transferring apparatus, comprising:

table means for receiving articles to be transferred from an infeed conveyor;

a transferring member for individually moving said articles across said table onto an outfeed conveyor;

means connected to said transferring member for initially elevating it to a position just behind each individual article and for subsequently pushing each individual article with said transferring member from said position across said table onto said outfeed conveyor; and first control means for actuating said elevating means to elevate said transferring member behind an individual article into said position for pushing that individual article onto said output conveyor, in response to movement of that individual article onto said table; and for subsequently deactuating said elevating means to maintain said transferring member in said position until said outfeed conveyor is ready to receive that individual article; and second control means for deactuating said infeed conveyor before said elevating means is actuated by said first control means to elevate said transferring member to said position to move an article and for actuating said infeed conveyor when said transferring member is in said position and said outfeed conveyor is ready to receive an article, said first and second control means comprising:

a source of power connected in a circuit with said infeed conveyor and said elevating means, said elevating means including a brake portion and a clutch portion;

first electronic eye means in said circuit for establishing a first control signal when said article has moved onto said table a predetermined distance;

means for deactuating said brake portion and actuating said clutch portion in response to said first control signal;

a cam driven by said elevating means in synchronism with said transferring member, said cam having a first lobe;

means actuated by said first cam lobe for deactuating said clutch portion and actuating said brake portion until said outfeed conveyor is in position to receive said article;

means cooperating with said outfeed conveyor and connected in said circuit for closing said circuit to said infeed conveyor when said outfeed conveyor is ready to receive said article;

second electronic eye means in said circuit for establishing a second control signal when a following article is in position to be received on said table means; and means responsive to said second control signal for opening said circuit to said infeed conveyor.

* * * * *